US008111582B2

(12) United States Patent
Beck et al.

(10) Patent No.: US 8,111,582 B2
(45) Date of Patent: Feb. 7, 2012

(54) PROJECTILE-DETECTION COLLARS AND METHODS

(75) Inventors: Steven David Beck, Austin, TX (US);
Douglas W. Hamm, Austin, TX (US);
Eric Charles Hoenes, Austin, TX (US);
Jorgen Ernst Harmse, Austin, TX (US);
George Andrew Bartlett, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 579 days.

(21) Appl. No.: 12/329,410

(22) Filed: Dec. 5, 2008

(65) Prior Publication Data

US 2010/0142328 A1 Jun. 10, 2010

(51) Int. Cl.
*G01S 3/80* (2006.01)
(52) U.S. Cl. .............................. 367/118; 367/906
(58) Field of Classification Search .................. 367/906, 367/118
See application file for complete search history.

(56) References Cited

U.S. PATENT DOCUMENTS

| | | | | |
|---|---|---|---|---|
| 5,214,615 A * | 5/1993 | Bauer | | 367/907 |
| 5,241,518 A | 8/1993 | McNelis | | 367/127 |
| 5,544,129 A | 8/1996 | McNelis | | 367/127 |
| 5,724,313 A * | 3/1998 | Burgess et al. | | 367/910 |
| 5,912,862 A | 6/1999 | Gustavsen | | 367/129 |
| 6,011,754 A * | 1/2000 | Burgess et al. | | 367/910 |
| 6,178,141 B1 | 1/2001 | Duckworth | | 367/127 |
| 6,185,153 B1 | 2/2001 | Hynes | | 367/124 |
| 6,847,587 B2 | 1/2005 | Patterson | | 367/127 |
| 6,859,420 B1 * | 2/2005 | Coney et al. | | 367/901 |
| 7,126,877 B2 | 10/2006 | Barger | | 367/127 |
| 7,139,222 B1 | 11/2006 | Baxter | | 367/127 |
| 7,190,633 B2 | 3/2007 | Brinn | | 367/13 |
| 7,203,132 B2 | 4/2007 | Berger | | 367/129 |
| 7,266,045 B2 | 9/2007 | Baxter | | 367/128 |
| 7,292,501 B2 | 11/2007 | Barger | | 367/118 |
| 7,362,654 B2 | 4/2008 | Bitton | | 367/127 |
| 7,372,772 B2 | 5/2008 | Brinn | | 367/127 |
| 7,408,840 B2 | 8/2008 | Barger | | 367/127 |
| 7,409,899 B1 | 8/2008 | Beekman | | 367/128 |
| 7,420,878 B2 | 9/2008 | Holmes | | 367/128 |
| 7,433,266 B2 | 10/2008 | Lédeczi | | 367/129 |
| 2005/0237186 A1 | 10/2005 | Fisher | | 340/539 |
| 2006/0079820 A1* | 4/2006 | Sandhu | | 602/18 |
| 2006/0114749 A1 | 6/2006 | Baxter | | 367/128 |
| 2007/0230269 A1 | 10/2007 | Ledeczi | | 367/117 |
| 2008/0008044 A1 | 1/2008 | Patterson | | 367/128 |
| 2008/0162089 A1 | 7/2008 | Barger | | 702/191 |
| 2008/0167835 A1 | 7/2008 | Zank | | 702/151 |
| 2008/0221793 A1 | 9/2008 | Fisher | | 701/213 |
| 2010/0142328 A1* | 6/2010 | Beck et al. | | 367/129 |

OTHER PUBLICATIONS

Five (5) pages printed from www.secures-gds.com less than one year prior to Dec. 5, 2008; date first available on internet is unknown.
Two (2) pages printed from www.QinetiQ-NA.com less than one year prior to Dec. 5, 2008; date first available on internet is unknown.

(Continued)

*Primary Examiner* — Daniel Pihulic
(74) *Attorney, Agent, or Firm* — Fulbright & Jaworski LLP; Mark T. Garrett

(57) ABSTRACT

User-wearable sensor arrays for use with projectile-detection systems, and methods of detecting a projectile with user-wearable sensor arrays.

25 Claims, 5 Drawing Sheets

OTHER PUBLICATIONS

Two (2) pages printed from http://www.plansys.com/ears.cfm on Nov. 24, 2008; date first available on internet is unknown.

Four (4) pages printed from http://www.bbn.com/products_and_services/boomerang/ on Nov. 24, 2008; date first available on internet is unknown.

Volgyesi et al., "Shooter Localization and Weapon Classification with Soldier-Wearable Networked Sensors," Proc. Of the 5$^{th}$ International Conference on Mobile Systems, Applications, and Services (Mobisys 07), San Juan, Puerto Rico, Jun. 2007.

Balogh and Ledeczi, "The Effects of Sampling Rate on Shooter Localization Accuracy by a Single Small Microphone Array," available on the World Wide Web after Dec. 5, 2007 but before Dec. 5, 2008.

* cited by examiner

PROJECTILE-DETECTION COLLARS AND METHODS

BACKGROUND

1. Field of the Invention

The present invention relates generally to projectile detection, and, more particularly, but not by way of limitation, to devices, systems, and methods for detecting characteristics of a projectile and/or the projectile source, such as may be used to derive the position of the projectile source.

2. Description of Related Art

Snipers can present a significant hazard to deployed soldiers and to the public at large. Single-shot gunfire events can be difficult to locate; thus, snipers may escape detection and create a repetitive danger. More overt attackers may also fire shots from a location to initiate a fire fight. In some environments, the source of such gunfire (or other projectiles) may be difficult to locate. For example, in urban environments, echoes may make it difficult for a person to audibly locate the source of gunfire, and/or obstructions may make it difficult for a person to visually locate the source of a projectile. By way of another example, when a sniper fires from a relatively large distance, the noise of the gunfire that is perceived by a person may be significantly reduced, thereby making it difficult for a person to even realize that the gunfire is directed in his or her direction. A number of systems have been developed that use one or more microphones or other sensors distributed over relatively large distances to detect gunfire and derive the approximate direction and/or range of the source of the gunfire, as well as other characteristics of the projectiles.

Some soldier-wearable systems have also been developed. For example, U.S. patent application Ser. No. 10/905,788, filed Jan. 20, 2005 and published as Pub. No. US 2005/0237186, now U.S. Pat. No. 7,750,814, and hereby incorporated by reference in its entirety, discloses a soldier-wearable system for acoustic event detection that uses a single sensor. Other soldier-wearable systems have been proposed, such as, for example, the EARS system manufactured by Planning Systems Inc., QinetiQ North America, 12030 Sunrise Valley Drive Suite 400, Reston, Va. 20191, U.S.A.; and the Boomerang Warrior system manufactured by BBN Technologies, 10 Moulton Street, Cambridge, Mass. 02138, U.S.A.

The following references may disclose examples of projectile-detection systems, and may facilitate a more complete understanding of the various embodiments of the present invention and uses for the various embodiments of the present invention: (1) U.S. patent application Ser. No. 10/905,788, filed Jan. 20, 2005, published as Pub. No. US 2005/0237186, and issued as U.S. Pat. No. 7,750,814; (2) U.S. patent application Ser. No. 11/042,414, filed Jan. 24, 2005 and published as Pub. No. US 2006/0114749, now U.S. Pat. No. 7,266,045; (3) U.S. patent application Ser. No. 11/227,446, filed Sep. 15, 2005 and published as Pub. No. US 2007/0230269, now U.S. Pat. No. 7,433,266; (4) U.S. patent application Ser. No. 11/482,899, filed Jul. 7, 2006 and published as Pub. No. US 2008/0008044, now abandoned; (5) U.S. patent application Ser. No. 12/074,884, filed Mar. 7, 2008 and published as Pub. No. US 2008/0162089, now U.S. Pat. No. 8,005,631; (6) U.S. patent application Ser. No. 10/593,922, filed Sep. 24, 2007 and published as Pub. No. US 2008/0167835 now U.S. Pat. No. 7,765,083; (7) U.S. patent application Ser. No. 11/930,072, filed Oct. 30, 2007 and published as Pub. No. US 2008/0221793; (8) U.S. Pat. No. 5,241,518, filed Feb. 18, 1992; (9) U.S. Pat. No. 5,544,129, filed Aug. 30, 1994; (10) U.S. Pat. No. 5,912,862, filed Sep. 23, 1996; (11) U.S. Pat. No. 6,178,141, filed May 28, 1999; (12) U.S. Pat. No. 6,185,153, filed Mar. 16, 2000; (13) U.S. Pat. No. 6,847,587, filed Jan. 24, 2003; (14) U.S. Pat. No. 7,126,877, filed Aug. 24, 2004; (15) U.S. Pat. No. 7,139,222, filed Jan. 20, 2005; (16) U.S. Pat. No. 7,190,633, filed Aug. 24, 2004; (17) U.S. Pat. No. 7,203,132, filed Apr. 7, 2006; (18) U.S. Pat. No. 7,266,045, filed Jan. 24, 2005; (19) U.S. Pat. No. 7,292,501, filed Aug. 24, 2004; (20) U.S. Pat. No. 7,362,654, filed May 24, 2005; (21) U.S. Pat. No. 7,372,772, filed Feb. 23, 2007; (22) U.S. Pat. No. 7,408,840, filed Oct. 13, 2006; (23) U.S. Pat. No. 7,420,878, filed Jan. 20, 2005; (24) U.S. Pat. No. 7,409,899, filed Nov. 26, 2004; and (25) U.S. Pat. No. 7,433,266, filed Sep. 15, 2005. The foregoing references numbered (1) through (25) are hereby incorporated by reference in their entireties.

SUMMARY

The present disclosure includes various embodiments of user-wearable sensor arrays for use with projectile-detection systems. Some embodiments of the present sensor arrays comprise, consist essentially of, or consist of: a plurality of sensors configured to detect at least one of sound waves and pressure waves caused by at least one of the muzzle blast and shockwave of a projectile; and a collar that supports the sensors, the collar being configured to be wearable around at least a portion of a user's neck. In some embodiments, the collar is configured to be wearable around at least a portion of a user's neck such that the sensors cooperate to define a sensor plane. In some embodiments, each sensor may also be substantially coplanar with the sensor plane.

In some embodiments, the plurality of sensors comprises 6 sensors. In some embodiments, the plurality of sensors comprises 6 microphones. In some embodiments, the plurality of sensors comprises one or more microphones each with a first sensitivity and one or more microphones each with a second sensitivity that is lower than the first sensitivity. In some embodiments, the plurality of sensors comprises a plurality of microphones and a plurality of pressure transducers. In some embodiments, the plurality of sensors comprises 6 microphones and 6 pressure transducers. In some embodiments, the plurality of sensors comprises one or more laser warning sensors.

Some embodiments of the present sensor arrays further comprise a plurality of wind shields each shielding at least one sensor. In some of these embodiments, each of the plurality of wind shields is configured to shield at least one sensor from wind speeds of up to 10 miles per hour.

In some embodiments, the plurality of sensors are supported by the collar at positions that provide a 360-degree detection field of view. In some embodiments, the detection field-of-view of each sensor overlaps the detection field-of-view of at least one adjacent sensor, and in some such embodiments, the detection field-of-view of each sensor overlaps the detection field-of-view of at least two adjacent sensors. In some embodiments, the plurality of sensors are supported at equiangular intervals by the collar.

In some embodiments of the present sensor arrays, the collar is resilient. In some embodiments, the collar comprises poly paraphenylene terephthalamide.

Some embodiments of the present sensor arrays further comprise a vest having a vest collar coupled to the collar of the sensor array. In some of these embodiments, the vest collar and the collar of the sensor array are of unitary construction. In some embodiments, the vest comprises body armor. In some embodiments, the vest is an improved outer tactical vest (IOTV).

Some embodiments of the present sensor arrays further comprise an inertial measurement unit configured to detect changes in the orientation of the collar. In some embodiments, the inertial measurement unit is configured to detect rotational changes in the orientation of collar. In some embodiments, the inertial measurement unit is configured to detect translational changes in the orientation of the collar. In some embodiments, the inertial measurement unit is configured to detect both translational changes and rotational changes in the orientation of the collar. As used in this disclosure, the "orientation" of the collar refers to the position of the collar, either absolute or relative (e.g., relative to the position of the projectile source). For example, in some embodiments, the IMU is configured to detect changes in orientation of the collar between the time at which the shockwave of a projectile is detected and either or both of the time at which the muzzle blast of the projectile is detected and the time at which the position of the projectile source is transmitted to the display (or is actually displayed to the user).

In some embodiments, the collar comprises an anchor point configured such that if the collar is worn by a user, the anchor point is capable of holding the collar in substantially fixed angular relation to the user. In various embodiments, the anchor point can comprise one or more of any of straps, buttons, snaps, hook-and-loop fasteners, hooks, adhesive, high-friction pads, tabs, latches, and any other suitable structure.

The present disclosure also includes various embodiments of methods of detecting a projectile with a user-wearable sensor array. Some embodiments of the present methods comprise, consist essentially of, or consist of: positioning a user-wearable sensor array around at least a portion of a user's neck; and detecting with at least one of the plurality of sensors at least one of sound waves and pressure waves caused by at least one of the muzzle blast and shockwave of a projectile. In some embodiments, detecting with at least one of the plurality of sensors includes detecting with at least two of the plurality of sensors at least one of sound waves and pressure waves caused by at least one of the muzzle blast and shockwave of a projectile, In some embodiments, detecting with at least one of the plurality of sensors includes detecting with at least three of the plurality of sensors at least one of sound waves and pressure waves caused by at least one of the muzzle blast and shockwave of a projectile. In some embodiments, the step of detecting includes detecting with at least two of the plurality of sensors at least one of sound waves and pressure waves caused by at least one of the muzzle blast and shockwave of a projectile. In some embodiments, the step of detecting includes detecting with at least three of the plurality of sensors at least one of sound waves and pressure waves caused by at least one of the muzzle blast and shockwave of a projectile.

In some embodiments, the sensor array comprises: a plurality of sensors configured to detect at least one of sound waves and pressure waves caused by at least one of the muzzle blast and shockwave of a projectile; and a collar that supports the sensors, the collar being configured to be wearable around at least a portion of a user's neck. In some embodiments, the collar is configured to be wearable around at least a portion of a user's neck such that the sensors cooperate to define a sensor plane. In some embodiments, each sensor may also be substantially coplanar with the sensor plane.

In some embodiments of the present methods, the predetermined positions of the sensors are distributed around the user's neck such that the plurality of sensors has a 360-degree detection field of view. In some embodiments of the present methods, the collar is supported by the collar of a vest, and the step of positioning the sensor array comprises positioning the vest on the user.

Any embodiment of any of the present methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more steps possesses those one or more steps, but is not limited to possessing only those steps. Likewise, a method that "comprises," "has," "includes" or "contains" one or more steps possesses those one or more steps, but is not limited to possessing only those one or more steps. For example, in a method that comprises the steps of positioning a user-wearable sensor array around at least a portion of a user's neck, and detecting at least one of sound and pressure waves caused by a projectile, the method includes the specified steps but is not limited to having only those steps. For example, such a method could also include connecting the sensor array to a vest prior to positioning the sensor array around at least a portion of the user's neck.

Further, a device or structure that is configured in a certain way is configured in at least that way, but it can also be configured in other ways than those specifically described.

Figure 1:
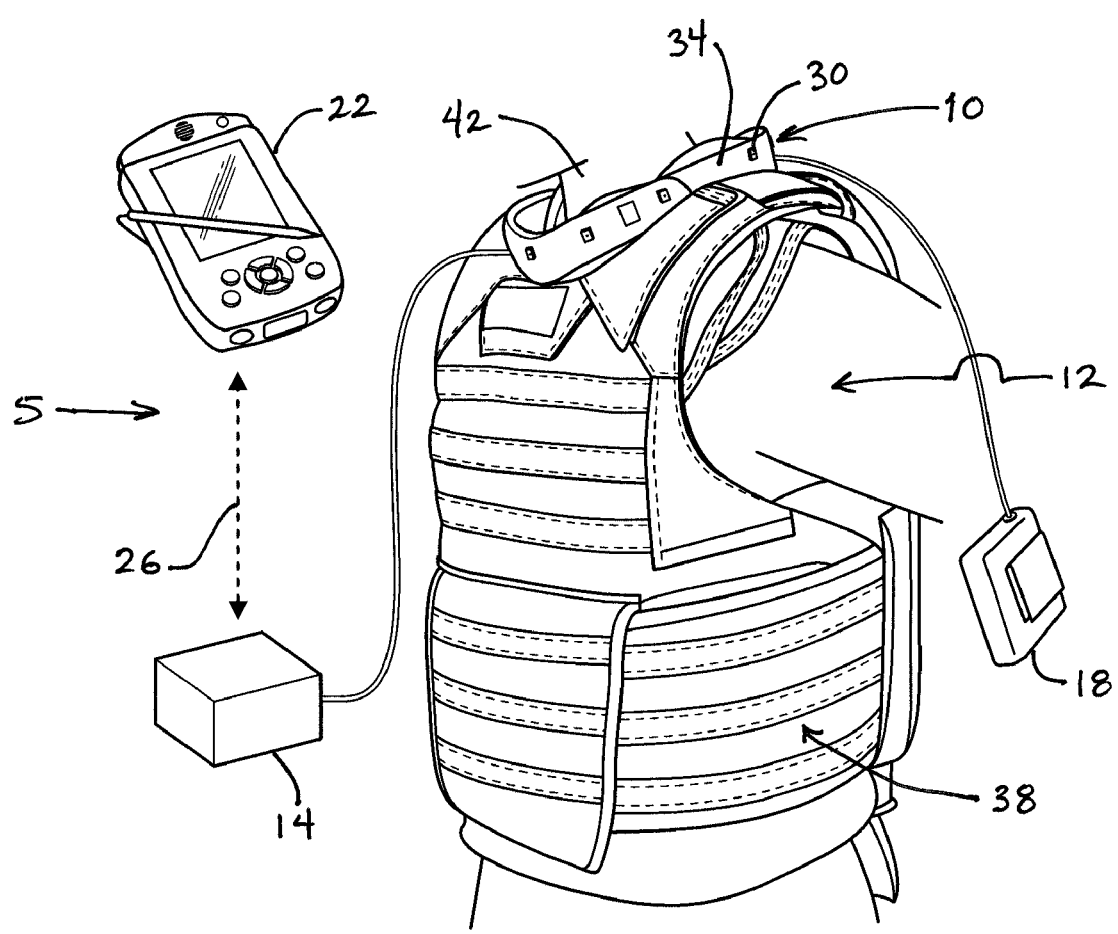
FIG. 1 depicts one of the present projectile-detection collar system illustrated in conjunction with a vest worn on a human torso.

Referring now to the drawings, and more particularly to FIG. 1, shown there and designated by the reference numeral 5 is one exemplary embodiment of a projectile-detection system having a user-wearable sensor array 10 worn by a user 12. In the embodiment shown, the system 5 comprises sensor array 10, a controller 14, a power source 18, and a display 22 configured to communicate with controller 14 via wireless link 26. Sensor array 10 comprises a plurality of sensors 30 supported by a collar 34. The plurality of sensors 30 is configured to detect at least one of the muzzle blast and shockwave of a projectile that passes within a detectable range of the sensor array (e.g., within a range in which at least one of the muzzle blast and shockwave of the projectile is detectable by at least one sensor of the sensor array). As used in this disclosure, "configured to detect" means that the plurality of sensors is capable of detecting at least one of the muzzle blast and shockwave of a projectile, but does not require that any of the sensors actually detect either the muzzle blast or the shockwave of a projectile (unless expressly required by the terms of a claim).

Controller 14 is configured to receive detected projectile information (e.g., muzzle blast and/or shockwave) from at least one sensor of the sensor array, and to derive the position of the projectile source (not shown) from the detected projectile information. Power source 18 can be any source capable of supplying power to the controller and/or the sensors, such as, for example, a housing for receiving one or more batteries and enabling electrical communication between the one or more batteries and at least one of the controller and the sensors. Display 22 is configured to receive from the controller (e.g., via wireless link 26) information related to the projectile and/or projectile source (e.g., position of projectile source, caliber of projectile, miss distance, and the like), and to display at least some of the information (e.g., position of projectile source, relatively and/or absolutely) in a format perceivable by the user.

Collar 34 supports the sensors, and is configured to be wearable around at least a portion of a user's neck. In the embodiment shown, collar 34 (which supports the sensors) is integral to the collar of a vest 38. Vest 38 is shown as an Improved Outer Tactical Vest (IOTV) that comprises body armor and is manufactured by BAE Systems, Inc., 7822 South 46th Street, Phoenix, Ariz. 85044 U.S.A. Stated otherwise, in the embodiment shown, the vest collar is integral to (serves as) collar 34, which supports sensors 30. In other embodiments, the various embodiments of the present sensor arrays can be supported by, connected to, integrated with, or otherwise coupled to other vests, articles of clothing, body armor, and the like. In some embodiments, the present sensor arrays are independent of any specific article of clothing such that collar 34 is wearable by a user independent of vest 38 or any other article of clothing.

Figure 2A:
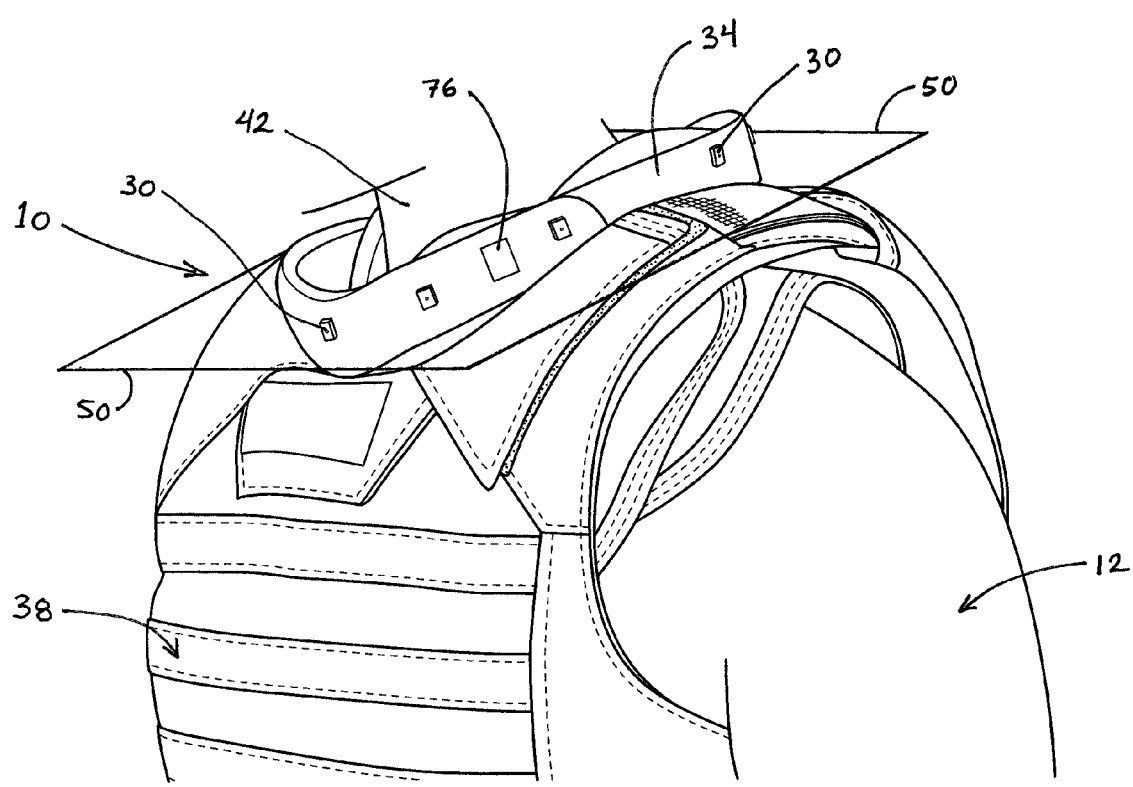
FIGS. 2A-2C depict enlarged views of a projectile-detection collar of the system of FIG. 1 for use in conjunction with a vest worn on a human torso.
Figure 2B:
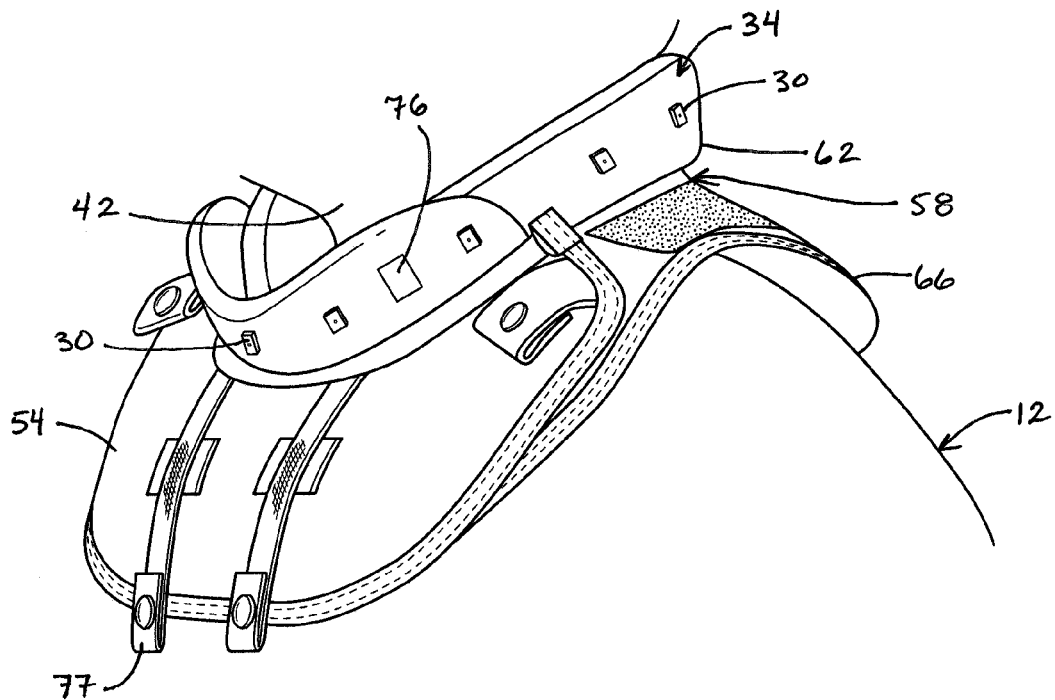
Figure 2C:
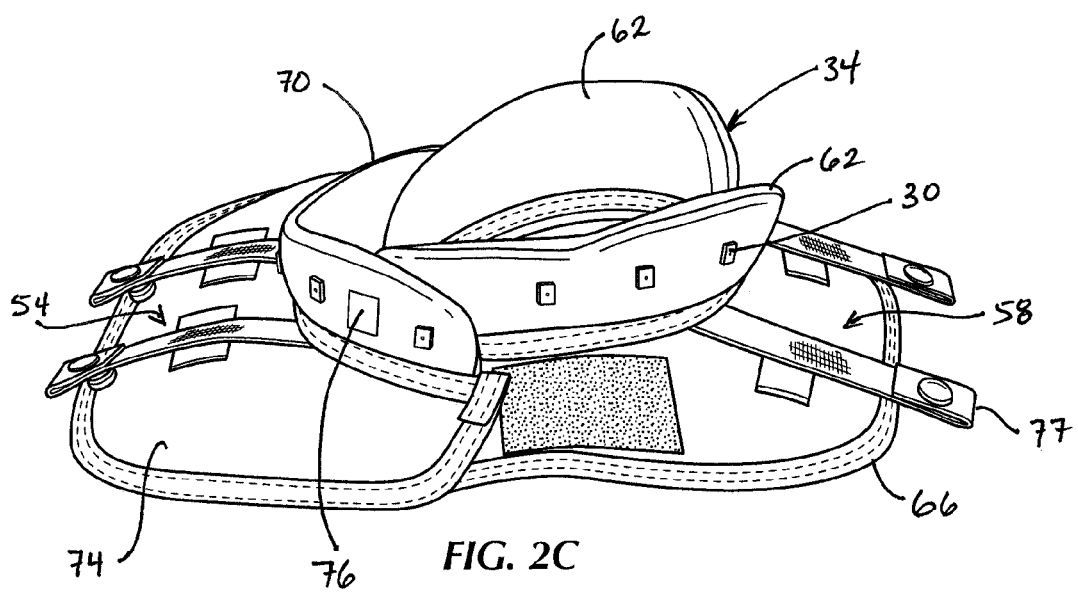

Referring now to FIGS. 2A-2C, various views are shown of the user-wearable sensor array depicted in FIG. 1. In some embodiments, sensors 30 are configured to detect at least one of sound waves and pressure waves caused by at least one of the muzzle blast and shockwave of a projectile. The collar is configured to be wearable around at least a portion of a user's neck 42 such that the sensors 30 cooperate to define a sensor plane 50. As used in this disclosure, "cooperate to define a sensor plane" means that the positions of the sensors are such that a plane (sensor plane) contacts or passes through at least a majority of the plurality of sensors (up to all of them), and does not require that the sensor plane contacts or passes through every sensor on the collar. In some embodiments, each sensor may also be substantially coplanar with the sensor plane.

In the embodiment shown, the plurality of sensors comprises twelve sensors 30 supported at equiangular 30 degree intervals by the collar, such that the plurality of sensors are supported by the collar at positions that provide a 360 degree field of view. In the embodiment shown, the detection field of view of each sensor overlaps the detection field-of-view of at least two adjacent sensors (e.g., at least one adjacent sensor on each side, or at least two sensors on one side). In other embodiments, the plurality of sensors can comprise any suitable number of sensors distributed around at least a portion of the user's neck, such as, for example, less than, equal to, at least, or greater than: two, three, four, five, six, seven, eight, nine, ten, eleven, twelve, thirteen, fourteen, fifteen, sixteen, seventeen, eighteen, or more sensors 30. In other embodiments, sensors 30 can be positioned in any suitable fashion around at least a portion of the user's neck, such as, for example, individually at equiangular intervals, individually at non-equal angular intervals, in groupings at equiangular intervals, or in groupings at non-equal angular intervals. In other embodiments, the array can be configured (e.g., by number or position) such that the plurality of sensors has any suitable field of view, such as, for example, less than, equal to, at least, or greater than any one of, or between any range of, about 90, 120, 135, 150, 180, 210, 225, 240, 270, 300, 315, 330, and 360 degrees.

In some embodiments, sensor array 10 comprises one or more microphones 30 each with a first sensitivity (high-sensitivity microphones) and one or more microphones 30 each with a second sensitivity that is lower than the first sensitivity (low-sensitivity microphones). For example, some embodiments of the sensor array comprise six high-sensitivity microphones capable of accurately detecting sound and/or pressure waves up to about 120 dB, and six low-sensitivity microphones capable of accurately detecting sound and/or pressure waves above about 110 dB. In some of these embodiments, the low-sensitivity microphones and high-sensitivity microphones are supported by the collar in an alternating configuration, e.g., high-sensitivity microphone, low-sensitivity microphone, high-sensitivity microphone, and so on. In some embodiments, the high-sensitivity microphones and/or low-sensitivity microphones can be configured to accurately detect sound and/or pressure waves within any suitable range or ranges. For example, in some embodiments, the high-sensitivity microphones are capable of accurately detecting sound and/or pressure waves between about 80 dB and about 120 dB, and the low-sensitivity microphones are capable of detecting sound and/or pressure waves between about 110 dB and about 150 dB. As used in this disclosure, "capable of accurately detecting" means capable of detecting waves and outputting an electronic signal with a total harmonic distortion (THD) of less than or equal to five percent (5%). For example, in some embodiments capable of accurately detecting sound and/or pressure waves of a projectile (shockwave or muzzle blast), one or more of the plurality of sensors are microphones each has a bandwidth in excess of 10,000 Hz and an upper distortion limit in excess of 140 dB.

In other embodiments, the sensor array can comprise one or more microphones, one or more pressure transducers, one or more other sensors configured to detect sound waves and/or pressure waves, or any combination of microphones, pressure transducers, and/or sensors. For example, in some embodiments, the sensors comprise six microphones and six pressure transducers. In some embodiments in which the sensors comprise microphones and pressure transducers, the microphones and pressure transducers are configured in an alternating arrangement (e.g., microphone, pressure transducer, microphone, pressure transducer, and so on). In some embodiments, the array further comprises a plurality of wind shields (not shown) each shielding at least one sensor. In some of these embodiments, each of the plurality of wind shields is configured to shield at least one sensor from wind speeds of up to 10 miles per hour.

In some embodiments, each sensor has a diameter of less than 6 millimeters and/or a height less than or equal to about 7 millimeters. Examples of microphones that may be suitable for various embodiments include: electret microphones such as: model WM-64 and others, manufactured by Panasonic Corporation, Secaucus, N.J., U.S.A.; model 3307-5 and others, available from Gentex 324 Main Street, Simpson, Pa. 18407, U.S.A.; model 1207A and others, available from Resistance Technology Corp. (RTI), 1260 Red Fox Road, Arden Hills, Minn. 55112, U.S.A.; and model EK-26899-P58 and others, available from Knowles Electronics, 1151 Maplewood Drive, Itasca, Ill. 60143, U.S.A.

In some embodiments, each sensor has a maximum transverse dimension (e.g., width, diameter) of less than about any of 10, 9, 8, 7, 6, and 5 millimeters.

In some embodiments, the collar is configured to be removed from a user and placed at a distance from the user (e.g., on a tripod or other support structure) in a predetermined operational shape or a shape that is substantially the same as the predetermined operational shape. In such embodiments, for example, while in a foxhole or behind a barrier, a user can remove the collar and place the collar outside the foxhole or above the barrier such that the collar is capable of sensing projectiles while the user retains the protection of the foxhole or barrier. In some of these embodiments, the collar is rigid or substantially rigid.

In some embodiments, the plurality of sensors can comprise one or more laser warning sensors capable of indicating when a laser (e.g., a targeting laser) is incident on the collar. Similar laser warning sensors include those that are of suitable size for mounting on a collar, and that are similar to any of the sensors used in laser-tag equipment, the sensors used to detect lasers in automotive radar detectors, and those that are used in the Multiple Integrated Laser Engagement System (MILES) used for training by the United States military. Examples of laser warning sensors that may be suitable for certain embodiments of the present sensor arrays include photodiodes such as the SD200, the SD290, and others available from Photonics Industries International, Inc., 390 Central Avenue, Bohemia, N.Y. 11716, U.S.A.

In the embodiment shown, the collar (or at least a portion of the collar) is at least semi-rigid. In some embodiments, the collar is entirely rigid. In some embodiments, the collar is also, or alternatively, configured to at least partially insulate (e.g., acoustically) sensors 30 from one another. In some embodiments, the collar is also, or alternatively, resilient. In embodiments in which the collar is resilient, the collar can also be configured to automatically return (e.g., after deformation) to a predetermined operational shape, or at least to a shape that is substantially the same as a predetermined operational shape. For example, in FIGS. 1 and 2A, the collar is in a predetermined operational shape in which the sensors cooperate to define sensor plane 50, and is also in an operational position at least partially around the user's neck. The collar can comprise any suitable material or combination of materials that permits the collar to have one or more of the described characteristics. For example, in the embodiment shown, in which collar 34 is a collar of an IOTV, the collar comprises poly paraphenylene terephthalamide (known as Kevlar).

In some embodiments, collar 34 is configured to be deformable and/or "openable" (separatable) so as to facilitate and/or enable the user to "put on" or "take off" the sensor array (e.g., to place the sensor array in the operational configuration at least partially around the user's neck, or to remove the sensor array from the operation position). Stated otherwise, the collar can be configured to be deformable and/or openable so as to enable at least a portion of the collar to be expanded or separated to permit the collar to be placed in the operational position around the user's neck. For example, as best shown in FIGS. 2B and 2C, collar comprises two components: a front, throat-protector component 54 and a rear component 58. As shown, the rear component 58 comprises a pair of upper portions 62 wrapping around the sides of the user's neck and overlapping on another at the back of the user's neck, and a lower portion 66 coupled to (and in this embodiment, contiguous to) both upper portions 62. Front component 54 similarly includes an upper portion 70 corresponding to (and when installed, overlapping) upper portions 62 of the rear component, and a lower portion 74 corresponding to (and when installed, overlapping) lower portion 66 of the rear component.

In some embodiments, it is desirable to know (e.g., at controller 14) the position of the sensors relative to one another, such as, for example, to derive the position of a projectile source. In some of embodiments, it may be sufficient to approximate the position of the sensors relative to one another. In other embodiments, it may be desirable to know the position of the sensors relative to one another with precision, though not necessarily exactly, so as to reduce the error in deriving the position of a projectile source. In some embodiments of the collar, the front and rear components may be adjustable relative to one another, such as, for example, to be more comfortable for users with a variety of neck sizes. In such embodiments of the collar shown, the sensors on the rear component (front sensors) of the collar will remain in known, predetermined positions relative to one another, and the sensors on the front component (front sensors) will remain in known, predetermined positions relative to one another. However, the positions of the front sensors will be adjustable relative to the positions of the rear sensors. For some adjustable embodiments of the collar, it may be sufficient to approximate the positions of the front sensors relative to the positions of the rear sensors. Other adjustable embodiments of the collar can include a device (not shown) for registering the position of the front component (and thereby the front sensors) relative to the position of the rear component (and thereby the rear sensors), such as, for example, one or more predetermined adjustment positions in which the sensors are in predetermined positions that can be communicated to or stored in the controller, one or more strain gauges or other position sensors, or the like.

In other non-adjustable embodiments of the collar shown, the front and/or rear components may be manufactured in a variety of fixed, predetermined sizes, such that when installed on or worn by a user, the front and rear components (and thereby the sensors) are in fixed, predetermined relation to one another. In such embodiments, the position of the front sensors relative to the positions of the rear sensors will be predetermined and known with some precision. In other embodiments, the collar can comprise a single component capable of wrapping around the user's entire neck.

In some embodiments, the array further comprises an inertial measurement unit (IMU) 76 configured to detect changes in the position of the collar. For example, if the plurality of sensors detects the shockwave of a projectile while the user is moving and a moment later detects the muzzle blast of the projectile, it can improve the accuracy of the derived position of the projectile source to measure (and factor into the derivation) the change in position of the sensor array between the time the shockwave and muzzle blast were detected, respectively. In some embodiments, IMU 76 is further configured to detect the angle of sensor plane 50 relative to the earth (e.g., whether and to what degree the sensor is plane is out of level). The IMU can have any suitable number of accelerometers or other sensors for detecting changes in position of the collar. For example, where the IMU is configured to detect changes in position in two axes, it can comprise two accelerometers; and where the IMU is configured to detect changes in position in three axes, it can comprise three accelerometers. In some embodiments, the IMU can additionally or alternatively comprise a compass, a global positioning satellite receiver, and/or any other suitable positioning sensors or devices. Examples of IMUs that may be suitable for various embodiments include the $MAG^3$, and others, available from MEMSense, LLC, 2693D Commerce Rd., Rapid City, S. Dak. 57702, U.S.A.

Some embodiments of the present sensor arrays comprise at least one anchor point (not shown) configured to inhibit rotation of the collar relative to the user, such that, for example, angles relative to the array are equivalent to angles relative to a certain portion of the user (e.g., the user's chest). For example, an anchor point can comprise one or more barbs extending from the collar, hook-and-loop fasteners, snaps, buttons, straps, or any other structure or configuration capable of maintaining the collar in substantially fixed angular relation to the user. By way of another example, in embodiments in which the collar is integral to or connected to a vest or other article of clothing, the anchor point is effectively the seam or other structure holding the collar in fixed relation to the article of clothing. For example, in the embodiment shown, collar 34 comprises a plurality of anchor points 77 for connecting the collar to the vest.

Figure 3A:
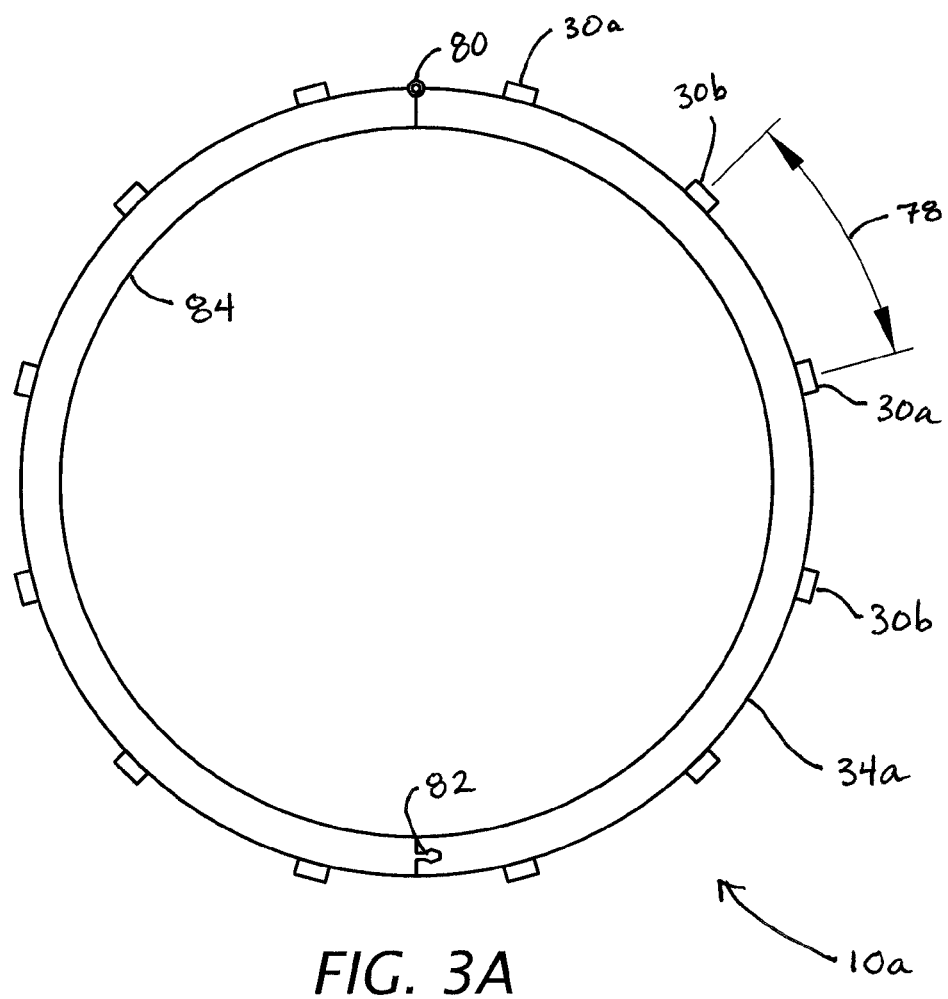
FIGS. 3A-3B depict top and side views, respectively, of a second exemplary embodiment of a sensor array having a plurality of sensors supported by a collar.
Figure 3B:
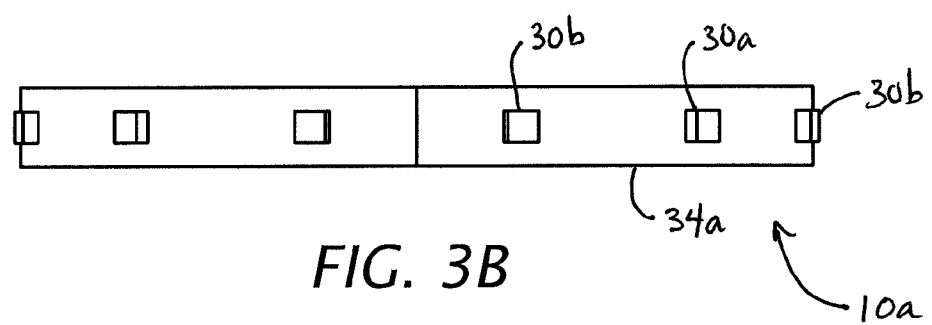

Referring now to FIGS. 3A-3B, another embodiment of a sensor array 10a is shown. Sensor array 10a is similar in some respects to sensor array 10, described above. For example, sensors 30 are positioned at equiangular intervals 78, of thirty degrees each, around collar 34a. As such, the differences between sensor array 10a and sensor array 10 are described here. Sensor array 10a includes a collar 34a that can be worn by a user independently of a vest or other article of clothing. As described above generally, sensor array 10a comprises a plurality of microphones including six low-sensitivity microphones 30a and six high-sensitivity microphones 30b, in alternating arrangements (30a, 30b, 30a, 30b, and so on). In some such embodiments, pressure transducers can be used to supplement or replace the low-sensitivity microphones.

Collar 34a is shown with a hinge 80 and a latch 82, such as, for example, to permit collar 34a to be opened to permit a user to place the collar around the user's neck, and then to close the collar and into a fixed, operational configuration in which the sensors cooperate to define sensor plane 50 and the sensors are in predetermined positions relative to one another around the user's neck in which at least a majority of the plurality of sensors cooperate to define the sensor plane. In some embodiments, the collar can comprise a material that is elastic and/or resilient enough that the hinge can be omitted while still permitting the collar to temporarily deform enough to permit the user to "put on" or "take off" the sensor array by deforming the collar and, at least when putting on the collar, returning the collar to the predetermined operational shape or at least a shape that is substantially the same as the predetermined operational shape.

In other embodiments, the collar can comprise an elastic material. In some embodiments, the collar can form an elastic loop with the sensors coupled to, and supported by, the collar at equal intervals along the elastic band. In such embodiments, the hinge can be omitted and the latch (or similar structure) optionally retained, such that the collar can be placed around the neck of the user (or collar worn by the user) and the elasticity of the band can automatically position the sensors at approximately equiangular intervals around the user's neck.

In some embodiments, the collar is defined by an internal circumference—the largest circumference that will fit within the shape circumscribed (or partially circumscribed) by an interior surface 84 of the collar. For example, in some embodiments, the internal circumference of the collar is less than, equal to, at least, or greater than any one of, or range between, any of about: 10, 11, 12, 13, 14, 15, 16, 17, 18, 19, 20, 21, 22, 23, and 24 inches. In some embodiments, the collar is defined by a maximum diameter—the largest transverse dimension that will fit within the shape circumscribed (or partially circumscribed) by interior surface 84 of the collar. For example, in some embodiments, the internal diameter of the collar is less than, equal to, at least, or greater than any one of, or range between any of, about: 2.5, 3, 3.5, 4, 4.5, 5, 5.5, 6, 6.5, and 7 inches.

In some embodiments, the sensor array can comprise a suitable number of sensors supported by the collar within a certain volume. For example, the sensor array can comprise twelve (12) sensors supported by the collar in a volume that is less than about 170 cubic inches, meaning that the sensors themselves (and not necessarily the collar) fit within the volume. In various other embodiments, the sensor array can comprise any suitable number of sensors, such as, for example, 2, 3, 4, 5, 6, 7, 8, 9, 10, 11, 12, 13, 14, 15, 16, 17, 18, or more sensors, in a volume that is less than, or within a range between, any of about: 10, 15, 20, 25, 30, 35, 40, 45, 50, 60, 70, 80, 90, 100, 120, 130, 140, 150, 160, 170, 180, 190 and 200 cubic inches.

Figure 4A:
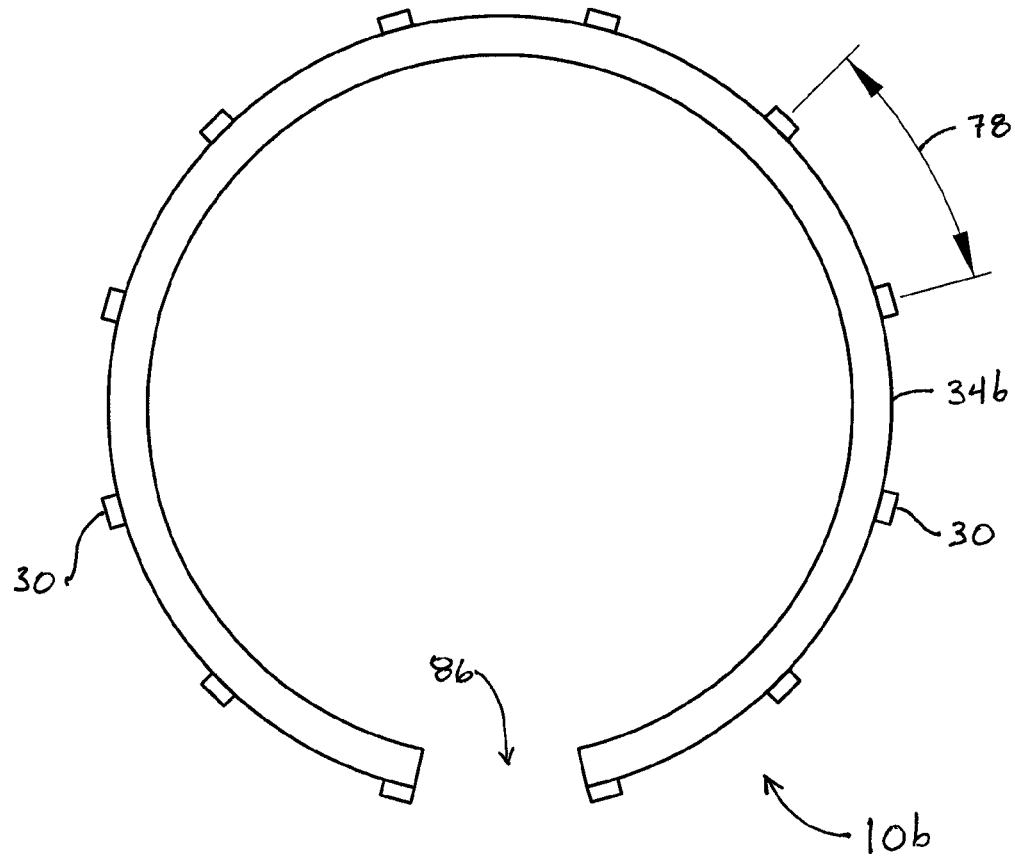
FIGS. 4A-4B depict top and side views, respectively, of a third exemplary embodiment of a sensor array having a plurality of sensors supported by a collar.
Figure 4B:
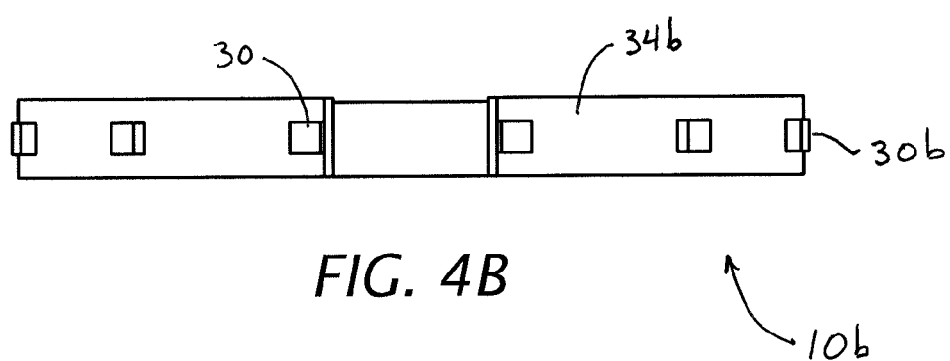

Referring now to FIGS. 4A and 4B, another embodiment of a sensor array 10b is shown. Sensor array 10b is similar in some respects to sensor arrays 10 and 10a, described above. As such, the differences between sensor array 10b and sensor arrays 10 and 10a are described here. Collar 34b can comprise a resilient material and an opening 86 that cooperate to permit a user to apply a force to deform the collar to permit a user to "put on" or "take off" the sensor array, and to enable the collar to, once the force is removed, automatically return to its predetermined operational shape or at least a shape that is substantially similar to the predetermined operational shape.

Some embodiments of the present disclosure comprise a method of detecting a projectile with a user-wearable sensor array, e.g., 10, 10a, 10b. Some of the present methods comprise: positioning a user-wearable sensor array around at least a portion of a user's neck, the sensor array comprising: a plurality of sensors configured to detect at least one of sound waves and pressure waves caused by at least one of the muzzle blast and shockwave of a projectile; and a collar that supports the sensors, the collar being configured to be wearable around at least a portion of a user's neck. In some embodiments, the collar is configured to be wearable around at least a portion of a user's neck such that the sensors cooperate to define a sensor plane. In some embodiments, each sensor may also be substantially coplanar with the sensor plane. In some embodiments, the method further comprises detecting with at least one of the plurality of sensors at least one of sound waves and pressure waves caused by at least one of the muzzle blast and shockwave of a projectile. In some embodiments, the step of detecting includes detecting with at least two of the plurality of sensors at least one of sound waves and pressure waves caused by at least one of the muzzle blast and shockwave of a projectile. In some embodiments, the step of detecting includes detecting with at least three of the plurality of sensors at least one of sound waves and pressure waves caused by at least one of the muzzle blast and shockwave of a projectile.

In some embodiments of the present methods, the plurality of sensors are supported by the collar at positions that provide a 360-degree detection field of view. In some embodiments of the present methods the sensor array further comprises a vest having a vest collar coupled to the collar of the sensor array, and the step of positioning the sensor array comprises positioning the vest on the user. In other embodiments of the present methods, the sensor array can comprise any one or combination of features and/or elements described above.

In any of the various embodiments described or suggested in this disclosure, the devices, systems, and methods can comprise or be limited to any combination of the elements, characteristics, steps, and/or features described, unless the context explicitly or necessarily precludes the combination. For example, one embodiment can comprise a plurality of sensors and a collar; another embodiment can comprise a plurality of sensors, a collar, and an inertial measurement unit; and another embodiment can comprise a plurality of sensors and a collar, where the plurality of sensors comprises one or more microphones and one or more pressure transducers.

The various illustrative embodiments of devices, systems, and methods described herein are not intended to be limited to the particular forms disclosed. Rather, they include all modifications, equivalents, and alternatives falling within the scope of the claims. For example, various embodiments can include a plurality of sensors supported by a collar that is integral to a coat; a plurality of sensors supported by a flexible collar that can be interchangeably affixed or connected to various pieces of clothing in a modular fashion, or can include two pluralities of sensors supported by a collar with each plurality of sensors cooperating to define a separate sensor plane.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A user-wearable sensor array for use with a projectile-detection system, the sensor array comprising:
    a plurality of sensors configured to detect at least one of sound waves and pressure waves caused by at least one of the muzzle blast and shockwave of a projectile; and
    a collar that supports the sensors, the collar being configured to be wearable around at least a portion of a user's neck.
2. The array of claim 1, where the plurality of sensors comprises 6 sensors.
3. The array of claim 2, where the plurality of sensors comprises 6 microphones.
4. The array of claim 3, where the plurality of sensors comprises one or more microphones each with a first sensitivity and one or more microphones each with a second sensitivity that is lower than the first sensitivity.
5. The array of claim 1, where the plurality of sensors comprises a plurality of microphones and a plurality of pressure transducers.
6. The array of claim 5, where the plurality of sensors comprises 6 microphones and 6 pressure transducers.
7. The array of claim 1, further comprising:
    a plurality of wind shields, each shielding at least one sensor.
8. The array of claim 7, where each of the plurality of wind shields is configured to shield at least one sensor from wind speeds of up to 10 miles per hour.
9. The array of claim 1, where the plurality of sensors are supported by the collar at positions that provide a 360-degree detection field of view.
10. The array of claim 1, where the plurality of sensors are supported at equiangular intervals by the collar.
11. The array of claim 1, where the collar is resilient.
12. The array of claim 1, where the collar comprises poly paraphenylene terephthalamide.
13. The array of claim 1, further comprising:
    a vest having a vest collar coupled to the collar of the sensor array.
14. The array of claim 13, where the vest collar and the collar of the sensor array are of unitary construction.
15. The array of claim 13, where the vest comprises body armor.
16. The array of claim 15, where the vest is an improved outer tactical vest (IOTV).
17. The sensor array of claim 1, further comprising:
    an inertial measurement unit configured to detect changes in the orientation of the collar.
18. The sensor array of claim 17, where the inertial measurement unit is configured to detect rotational changes in the orientation of collar.
19. The sensor array of claim 17, where the inertial measurement unit is configured to detect translational changes in the orientation of the collar.
20. The sensor array of claim 19, where the inertial measurement unit is also configured to detect rotational changes in the orientation of the collar.
21. The array of claim 1, where the collar is configured to be wearable around at least a portion of a user's neck such that the sensors cooperate to define a sensor plane.
22. A method of detecting a projectile with a user-wearable sensor array, the method comprising:
    positioning a user-wearable sensor array around at least a portion of a user's neck, the sensor array comprising:
        a plurality of sensors configured to detect at least one of sound waves and pressure waves caused by at least one of the muzzle blast and shockwave of a projectile; and
        a collar that supports the sensors, the collar being configured to be wearable around at least a portion of a user's neck; and
    detecting with at least one of the plurality of sensors at least one of sound waves and pressure waves caused by at least one of the muzzle blast and shockwave of a projectile.
23. The method of claim 22, where the plurality of sensors are supported by the collar at positions that provide a 360-degree detection field of view.
24. The method of claim 22, where the sensor array further comprises a vest having a vest collar coupled to the collar of the sensor array, and where the positioning comprises positioning the vest on the user.
25. The method of claim 22, where the collar is configured to be wearable around at least a portion of a user's neck such that the sensors cooperate to define a sensor plane.

* * * * *